United States Patent

[11] 3,622,224

[72] Inventors Joseph J. Wysocki
    Webster;
    Robert W. Madrid, Macedon, both of N.Y.
[21] Appl. No. 851,708
[22] Filed Aug. 20, 1969
[45] Patented Nov. 23, 1971
[73] Assignee Xerox Corporation
    Rochester, N.Y.

[54] LIQUID CRYSTAL ALPHA-NUMERIC ELECTRO-OPTIC IMAGING DEVICE
    37 Claims, 6 Drawing Figs.

[52] U.S. Cl. .................................. 350/150, 350/160 R
[51] Int. Cl. .................................. G02f 1/26
[50] Field of Search .......................... 350/150, 160

[56] References Cited
    UNITED STATES PATENTS
    3,067,413  12/1962  Fischle et al. ............ 350/150 X
    3,182,574  5/1965   Fleisher et al. .......... 350/150 X
    3,401,262  9/1968   Fergason et al. ......... 350/160 UX
    3,524,726  8/1970   De Koster ............... 350/160 X

OTHER REFERENCES

Heilmeier et al., Dynamic Scattering: "A New Electro-optic Effect in Certain classes of Nematic Liquid Crystals" Proc. IEEE Vol. 56, No 7 (July 1968) PP. 1162– 1171 350/160 (LC).

The Glass Industry (August 1968) pp. 423– 425, " Liquid Crystal, New Type of Electronic Display," 350/160 (LC)

Van Raalte, " Reflective Liquid Crystal Television Display " Proc. IEEE Vol. 56, No. 12 (December, 1968) pp. 2146–2149. 350/160 (LC)

Primary Examiner—David Schonberg
Assistant Examiner—Paul R. Miller
Attorneys—James J. Ralabate, David C. Petre and Roger W. Parkhurst ABSTRACT: An imaging system having a multiplanar series of alphanumeric images in conjunction with an electro-optic imaging cell suitable for displaying one or more of the images.

INVENTORS
JOSEPH J. WYSOCKI
BY  ROBERT W. MADRID

*Roger W. Parkhurst*
ATTORNEY

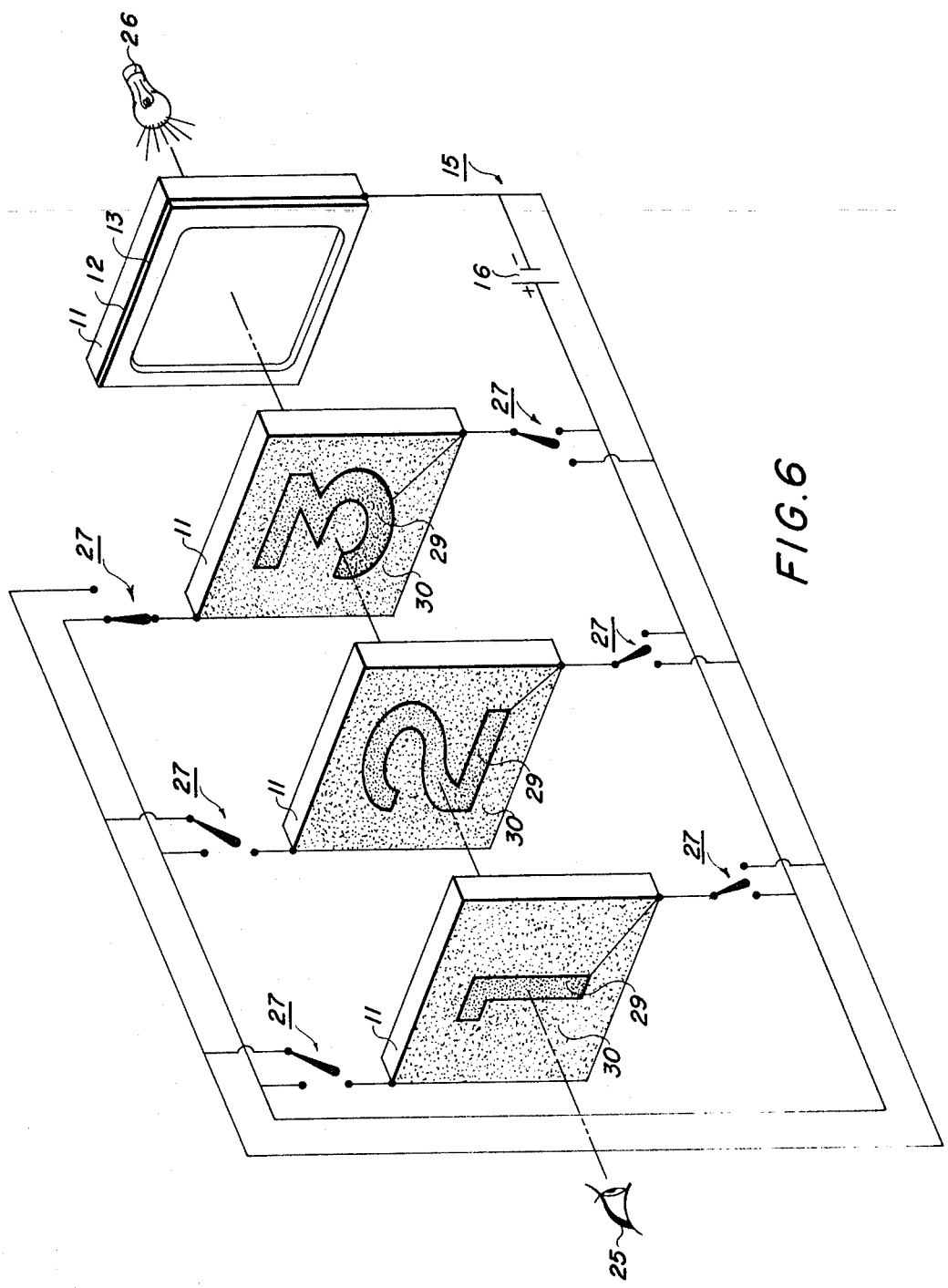

LIQUID CRYSTAL ALPHA-NUMERIC ELECTRO-OPTIC IMAGING DEVICE

BACKGROUND OF THE INVENTION

This invention relates to imaging systems, and more specifically to an alphanumeric imaging system wherein the imaging member comprises an electro-optic material.

Electro-optic materials are herein defined to be materials whose optical properties are sensitive to differing electrical environments of the material.

A class of electro-optic materials particularly suitable for use in systems such as the present invention is the class of materials known as liquid crystals. The name "liquid crystals" has become generic to substances exhibiting dual physical characteristics some of which are typically associated with liquids and others which are typically unique to solids. Liquid crystals exhibit the mechanical characteristics, such as viscosities, which are ordinarily associated with liquids. The optical scattering and transmission characteristics of liquid crystals are similar to those characteristics ordinarily unique to solids.

In liquids or fluids, the molecules are randomly distributed and oriented throughout the mass of the substance. Conversely, in crystalline solids the molecules are generally rigidly oriented and arranged in a specific crystalline structure. Liquid crystals resemble solid crystals in that the molecules of the liquid crystalline substance are regularly oriented in a fashion analogous to but less extensive than the molecular orientation and structure in a crystalline solid. Many substances have been found to exhibit liquid crystal characteristics in a relatively narrow temperature range; below the temperature range the substances appear only as crystalline solids, and above the temperature range they appear only as liquids. Liquid crystals are known to appear in at least three different mesomorphic forms: the smectic, nematic, and cholesteric. In each of these structures the molecules are typically arranged in a unique orientation.

Liquid crystals have been found to be sensitive or responsive to temperature, pressure, foreign chemical compounds, and to electric and magnetic fields. Such applications of liquid crystals and other electro-optic materials are disclosed in references such as copending applications Ser. No. 646,532, filed June 16, 1967; Ser. No. 646,533, filed June 16, 1967, now abandoned; Ser. No. 821,565; filed May 5, 1969; Fergason et al. Pat. No. 3,114,838; French Pat. No. 1,484,584 and Fergason Pat. No. 3,409,404.

Substances exhibiting liquid crystalline characteristics have been known for many years. However, only recently has there been a growing interest in developing practical applications utilizing the unique characteristics of these substances. Liquid crystals as well as other electro-optic materials have been disclosed for use in visual imaging applications in various systems as disclosed for example in Marks Pat. No. 2,543,793; and Williams Pat. No. 3,322,485; and more recently in publications such as "Liquid-Crystal Sandwich for Bright-Light Displays," EEE, Aug. 1968, pages 25–28, as well as in the above cited applications.

In new and growing areas of technology such as electro-optic imaging systems, new methods, apparatus, compositions of matter and articles of manufacture continue to be discovered for the application of the new technology in a new mode. The present invention relates to a new and advantageous system for producing alphanumeric images on electro-optic imaging members.

SUMMARY OF THE INVENTION

It is, therefore, an object of this invention to provide a novel imaging system.

It is another object of this invention to provide a novel imaging system using electro-optic materials.

It is another object of this invention to provide a novel liquid crystal imaging system.

It is another object of this invention to produce an alphanumeric, electro-optic imaging system wherein an electro-optic material is selectively imaged.

It is another object of this invention to provide an alphanumeric liquid crystal imaging system wherein a cholesteric liquid crystalline substance is transformed into the nematic liquid crystalline structure.

It is yet another object of this invention to provide an imaging system capable of producing a number of different intense and sharply defined images.

It is yet another object of this invention to provide an imaging system which produces a number of different image characters on the same image area.

It is yet another object of this invention to provide an imaging system having a small image area.

It is still another object of this invention to provide a multiplanar electro-optic imaging system.

It is still another object of this invention to provide a multiplanar, multi-image imaging system of greater simplicity than former systems.

The foregoing objects and others are accomplished in accordance with this invention by a system having a multiplanar series of alphanumeric images in conjunction with an electro-optic imaging cell suitable for displaying one or more of the images.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof, wherein:

FIG. 6 is a partially schematic, exploded isometric view of a multiplanar imaging device wherein the desired images are defined by the shape of the electrodes, which are adjacent to each other and substantially on one side of a single imaging cell.

DESCRIPTION OF THE PREFERRED EMBODIMENTS

Figure 1:
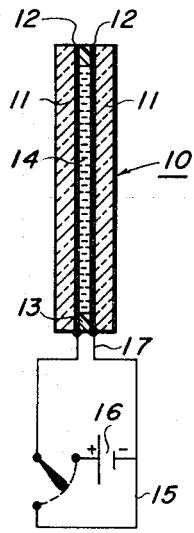
FIG. 1 is a cross-sectional, partially schematic view of an imaging member or cell.

In FIG. 1 a typical imaging cell 10, sometimes referred to as an electroded imaging sandwich, is shown in cross section wherein a pair of transparent plates 11 having substantially transparent conductive coating 12 upon the contact surface, comprise a parallel pair of substantially transparent electrodes. An imaging member wherein both electrodes are transparent is preferred where the imaging member is to be viewed using transmitted light; however, such imaging members may be viewed using reflected light thereby requiring only a single transparent electrode while the other may be opaque. The transparent electrodes are separated by spacing member 13 which contains voids which form one or more shallow cups or tanks which contain a suitable film or layer of electro-optic material which comprises the active element of the imaging member. In operation a field is created between the electrodes by an external circuit 15 which typically comprises a source of potential 16 which is connected across the two electrodes through leads 17. The potential source may be either DC, AC, or a combination thereof.

The system described in copending application Ser. No. 821,565, filed May 5, 1969, is one preferred for use in the imaging cell of the present invention. In that system cholesteric liquid crystals or a mixture of cholesteric liquid crystalline substances is used in an electrode sandwich such as that described in FIG. 1, and electrical fields across the liquid crystal film cause an electrical field-induced phase transition to occur wherein the optically negative cholesteric liquid crystalline substance transforms into an optically positive liquid crystalline state. This transition is believed to be the result of the cholesteric liquid crystal transforming into the nematic liquid crystalline mesophase structure. Cholesteric liquid crystals in the cholesteric state are typically translucent, for example, like a milky white, opalescent layer, when first placed in the unbiased electrode sandwich. When the electric field is placed across the liquid crystal film, the field-induced phase transition is observable because the liquid crystal film becomes transparent in areas where the field is present. Such transparent areas allow transmitted light to pass through them substantially unaffected.

Cholesteric liquid crystals suitable as the electro-optic imaging materials in the present invention include derivatives from reactions of cholesterol and inorganic acids; for example, cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate, cholesteryl hexanoate; cholesteryl formate; cholesteryl docosonoate; cholesteryl chloroformate; cholesteryl propionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl heptyl carbamate; and alkyl amides and aliphatic secondary amines derived from $3\beta$-amino-$\Delta 5$-cholestene and mixtures thereof; peptides such as poly-$\gamma$-benzyl-$\iota$-glutamate; derivatives of beta sitosterol such as sitosteryl chloride; and amyl ester of cyano cyan benzylidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise simply substituted benzene ring compounds. Any of the above compounds and mixtures thereof may be suitable for cholesteric liquid crystalline films in the advantageous system of the present invention.

Mixtures of liquid crystals can be prepared in organic solvents such as chloroform, petroleum ether, methylethyl ketone and others, which are typically subsequently evaporated from the mixture thereby leaving the liquid crystalline mixture. Alternatively, the individual liquid crystals of the liquid crystalline mixture can be combined directly by heating the mixed components above the isotropic transition temperature.

Although cholesteric liquid crystals are disclosed above as a preferred material for the electro-optic imaging material in the present invention, it will be clear that any electro-optic material which is similarly responsive to changes in its electrical environment, is suitable in the inventive system. For example, other suitable electro-optic imaging materials include: mixtures of fine metallic particles such as aluminum in insulating oils; suspensions of opaque platelike particles such as graphite in oil; and various other materials as disclosed in Donal, J. S., Jr., Proceedings of I. R. E., May 1943, p. 208; and by Marks in U.S. Pat. No. 2,543,793 and others.

In addition to the materials disclosed above, nematic liquid crystalline materials are also preferred electro-optic imaging materials in various embodiments of the present invention. Nematic liquid crystals are particularly suited for the inventive system because many nematic materials are typically transparent in the absence of electrical fields, and become opaque or light diffusing, translucent when placed under the incluence of electrical fields as in the present invention. Nematic liquid crystals typically operate in the present invention in at least two modes: (1) In the dynamic scattering mode, the molecules of the nematic liquid crystalline substance are aligned parallel to the plates in the electrode sandwich, and the electrical field forces ions to disrupt the aligned material thereby causing a flashing or scintillating light effect. (2) In the domain formation mode, the molecules of the nematic liquid crystalline substance are aligned by a field either parallel or perpendicular to the plates, depending upon whether the molecular dipoles are perpendicular or parallel, respectively to the major molecular axis. Application of an electric field in selected domains of the liquid crystalline layer causes the selective reorientation of the molecules in the selected domains. Before application of a field, the domains are made random by any suitable means. Depending upon the dipole orientation, the domain areas will either become transparent (where the dipoles are along the major molecular axes) or birefringment and light scattering (where the dipoles are perpendicular to the major molecular axes).

Nematic liquid crystalline materials suitable for use in the advantageous system of the present invention include: p-ozoxyanisole, p-azoxyphenetole, p-butoxybenzoic, p-methoxy cinnamic acid, butyl-p-anisylidene-p'-aminocinnamate, anisylidene para-amino-phenylacetate, p-ethoxy-benzalamino-a-methyl-cinnamic acid 1,4-bis (p-ethoxy benzylidene) cycle hexanone, 4,4'-dihexyloxybenzene, 4,4'-diheptyloxybenzene, anisal-p-amino-azobenzene, anisaldazine, a-benzeneazo-(anisal-z'-naphthylamine), n,n'-nonoxybenzeltoluidine, mixtures of the above and many others.

Smectic liquid crystalline materials are also suitable for use in the present invention and such smectic materials include: n-propyl-4'-ethoxy biphenyl-4-carboxylate; 5-chloro-6-n-heptyloxy-2-naphthoic acid at temperatures in the range of about 166°–176° C.; lower temperature mesophases of cholesteryl octanoate, cholesteryl nonanoate, and other open-chain aliphatic esters of cholesterol with chain length of 7 or greater; cholesteryl oleate; sitosteryl oleate; 4'-n-alkoxy-3'-nitrobiphanyl-4-carboxylic acids; ethyl-p-azoxycinnamate; ethyl-p-4-ethoxybenzylideneaminocinnamate; ethyl-p-azoxybenzoate; potassium oleate; ammonium oleate; p-n-octyloxybenzoic acid; the low temperature mesophase of 2-p-n-alkoxy-benzylideneaminofluorenones with chain length of 7 or greater; the low temperature mesophase of p-(n-heptyl) oxybenzoic acid; anhydrous sodium stearate; thallium (I) stearate; mixtures thereof and others.

In addition, to the materials listed above various mixtures of electro-optic materials may be used in the present invention. For example, mixtures of liquid crystalline materials, mixtures of cholesteric and nematic liquid crystals, mixtures of liquid crystals and various dyes, mixtures of liquid crystal and emulsifying agents such as Fluorolube, polymers of trifluorovinyl chloride available from the Hooker Chemical Corp., Niagara Falls, N.Y., and dimethyl formamide. Also, racemic mixtures of cholesteric liquid crystals, where the mixture comprises equal strength of right and left-hand optical rotary compounds, are suitable for use in the present invention.

In various embodiments of these electro-optic imaging cells, contrast enhancing devices such as polarizers or crossed polarizers may be advantageously used with the imaging cell. When viewed between polarizers with transmitted light, areas in which the imaging materials is transparent appear dark, while the light scattering translucent or opaque areas retain their colored appearance. This is particularly so when using the imaging system with cholesteric liquid crystalline electro-optic imaging materials where the field-induced phase transition takes place. In this system light passing through the translucent areas of the imaging material is either de-polarized or elliptically polarized so that light can pass through a pair of crossed polarizers having the imaging material between said polarizers. Therefore, it is seen that either field or nonfield areas in electro-optic imaging sandwiches may be used to create the desired image, with or without the addition of other means for image enhancement.

In the imaging cell described in FIG. 1, the electrodes may be of any suitable transparent conductive material. Typical suitable transparent, conductive electrodes include glass or plastic substrates having substantially transparent and continuously conductive coatings of conductors such as tin, indium, oxide, aluminum, chromium tin oxide, or any other suitable conductor. These substantially transparent conductive coatings are often evaporated onto the more insulating, transparent substrate. NESA glass, a tin oxide coated glass manufactured by the Pittsburgh Plate Glass Company, is a commercially available example of a typical transparent, conductive electrode material.

The spacer gasket, 13 in FIG. 1, which separates the transparent electrodes and contains the imaging material between said electrodes, is typically chemically inert, transparent, preferably not birefringent, substantially insulating and has appropriate dielectric characteristics. Materials suitable for use as insulating spacers include cellulose acetate, cellulose triacetate, cellulose acetate butyrate, polyurethane elastomers polyethylene, polypropylene, polyesters, polystyrene, polycarbonates, polyvinylfluoride, polytetrafluoroethylene, polyethylene terephthalate, and mixtures thereof.

Figure 2:
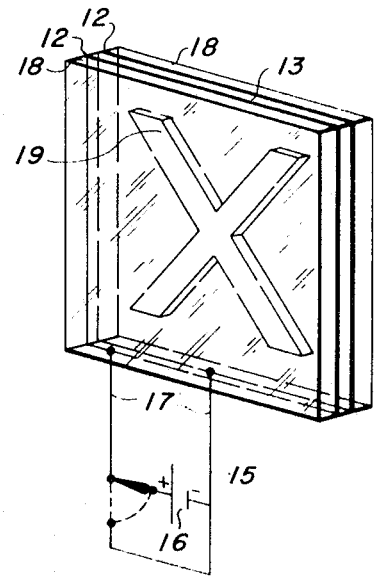
FIG. 2 is an isometric view of an embodiment of an imaging cell wherein the desired image is defined by the shape of the spacing member

The basic electro-optic imaging cell described in FIG. 1 is further described in FIG. 2 wherein the desired image configuration is defined by the shape of the void areas in spacer gasket 13. In such embodiments, the desired image area may be thought of as the shape of these void areas, the shape of the spacer gasket, or more correctly the shape of the electro-optic material within the voids defined by the shape of the spacer gasket. As before, transparent electrodes 18 are separated by the spacer 13, but the entire desired image area 19 comprises the electro-optic imaging material. In this embodiment the entire faces of the transparent electrodes comprise substantially transparent conductive coating 12 and the conductive coatings are electrically connected to external circuit 15. In operation, there is an electrical field across the entire area of the spacer 13, however the image caused by the response of the electro-optic material occurs only in the area 19 where the electro-optic imaging material is present.

Figure 3:
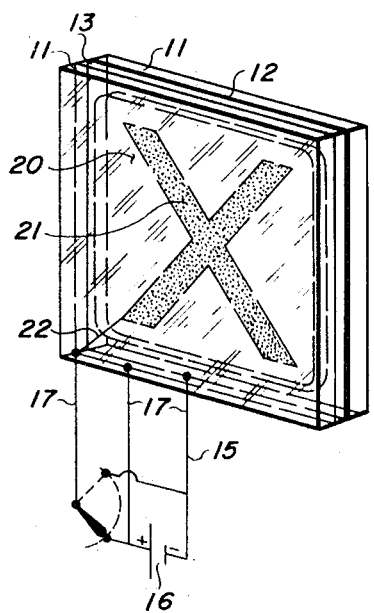
FIG. 3 is an isometric view of an embodiment of an imaging member wherein the desired image is defined by the shape of at least one of the electrodes.

In FIG. 3 another embodiment of the electro-optic imaging cell described in FIG. 1 is shown. In FIG. 3 the desired image is defined by the shape of at least one electrode, and therefore by the shape of a corresponding electrical field. The imaging member here comprises transparent plates 11 separated by spacer gasket 13 having void area 20 filled with electro-optic imaging material, and comprising substantially the entire area of spacer 13. The desired image area is defined by the shape of the substantially transparent conductive coating shown at 21, which is affixed to the inner surface of one or both of the transparent support plates 11, and is affixed in the desired image configuration. The embodiment illustrated in FIG. 3 shows only one of the two electrodes in image configuration; however, it will be understood by those skilled in the art that both electrodes could easily be made in a matched pair to define the same desired image. Similarly, the background, nonimage areas of the shaped electrode may also be electrodes (electrically insulated from the image electrode on the same surface) and such background area electrodes may be operatively connected to external circuit 15 as illustrated for example in FIG. 3. In this embodiment either image or background areas may be electrically connected to create an electrical field across the electro-optic imaging material. When the single image electrode configuration is used, the second electrode comprises transparent plate 11 with substantially transparent conductive coating 12 upon the entire area of the surface of the transparent electrode. It is noted that a very thin, or substantially invisible conductor 22 is typically necessary in this embodiment to electrically connect the electrode in the desired image configuration to external circuit 15 which is similarly connected to the conductive coating of the opposite electrode. In operation this embodiment will produce an electric field in areas where there are parallel electrodes, i.e., between the electrode in the desired image configuration, and the opposite electrode, whether or not the opposite electrode is also in the desired image configuration.

Figure 4:
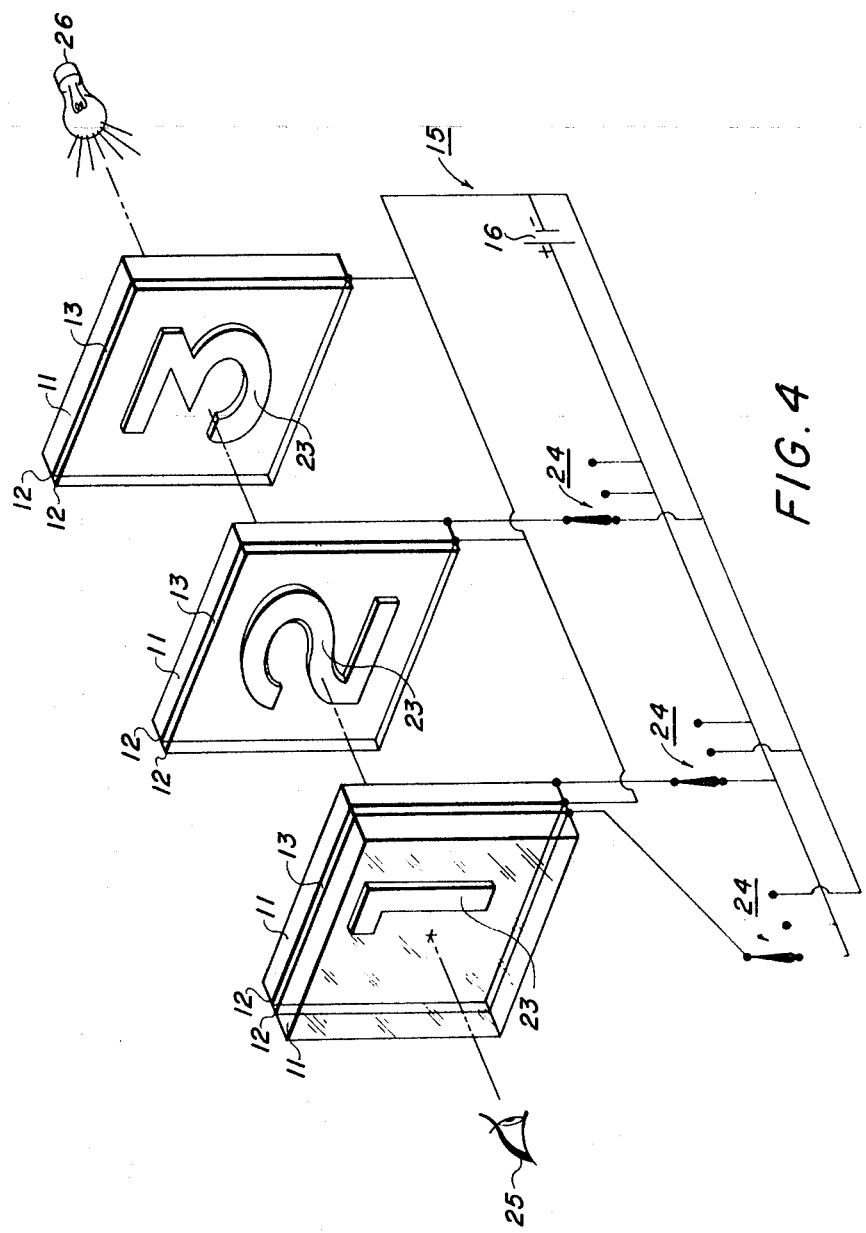
FIG. 4 is a partially schematic, exploded isometric view of a multiplanar, multiple cell, imaging device wherein the desired images are defined by the shape of the respective spacing members.

A preferred embodiment of the advantageous system of the present invention is similar to the one illustrated in FIG. 3, but comprises separate substantially transparent electrodes in image and background configuration on the same surface, and such electrodes on each side of the electro-optic imaging material. In this embodiment both image and background areas on one surface may be operatively connected to the external circuit means, thereby functioning together like a single full area electrode across the full area of that surface and of the surface of the imaging material. The opposite electrode may be operatively connected to create a field across the image material in image or background configuration, or both, as desired. In FIG. 4 a preferred embodiment of the advantageous multiplanar electro-optic imaging system of the present invention is shown in a partially schematic, exploded isometric view. It will be understood that the alphanumeric units illustrated in FIG. 4 as being spaced apart, are typically stacked in contact one behind the other. The individual imaging cells of the multiplanar system illustrated in FIG. 4 are similar to the cell illustrated in FIG. 2. Substantially transparent supporting layers 11 have substantially transparent, electrically conductive layer 12 thereon, and the individual imaging cells comprise two such substantially transparent electrodes having a spacing gasket 13 separating the electrodes. The desired alphanumeric images in this embodiment comprise the voids 23 in spacing members 13, which are typically filled with electro-optic imaging material, and which correspond to the void area 19 shown in FIG. 2. External circuit 15 having source of electrical potential 16 therein, and also illustrated with a selective switching system 24 is used to selectively actuate the desired cell or cells of the multiplanar imaging system so that the desired image appears to the eye of the viewer 25 when transmitted light from source 26 passes through the substantially transparent imaging system. Here substantially transparent is intended to mean any degree of transparency sufficient to allow any or all of the system's images to be viewed when the system is in operation.

When the device illustrated in FIG. 4 is used with an electro-optic imaging material in areas 23, and said material responds to the application of an electrical field across it by becoming transparent, i.e., as cholesteric liquid crystalline materials typically do, the device may be more advantageously used with image contrast enhancing devices such as polarizers or crossed polarizers. For the devices used with electro-optic imaging materials which respond to the electrical field across them by becoming translucent and light scattering, i.e. as nematic liquid crystalline substances typically do, it may often be just as advantageous to use the system without the image contrast enhancing devices.

Although the device illustrated in FIG. 4 may be constructed by simply stacking a series of electro-optic imaging cells like the one illustrated in FIG. 2, one behind the other, an advantageous way of conserving materials and making the desired imaging system as small as possible is to use transparent support members 11 having substantially transparent conductive coatings 12 on both sides of the support member 11, as illustrated in FIG. 4.

Figure 5:
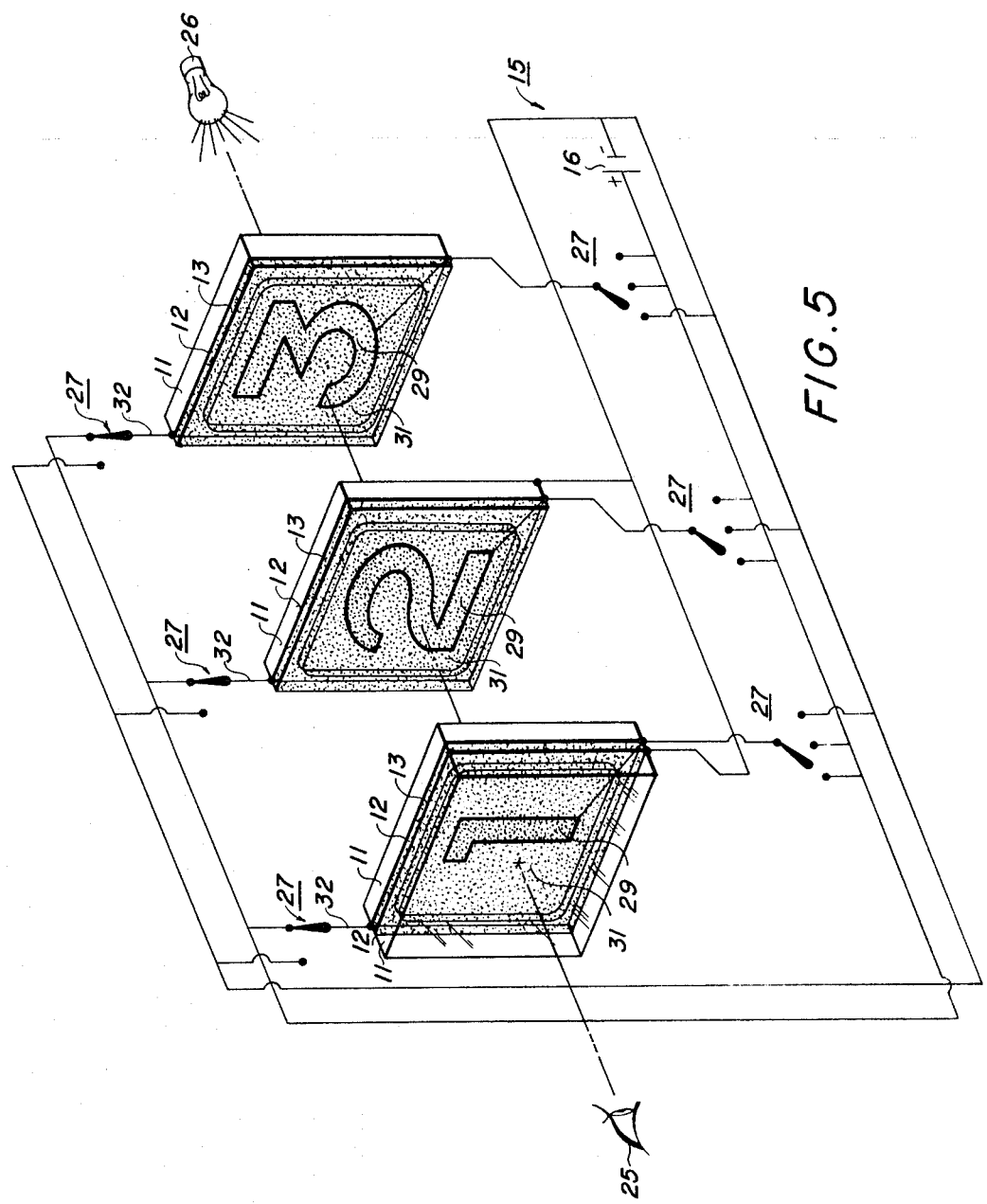
FIG. 5 is a partially schematic, exploded isometric view of a multiplanar, multiple cell imaging device wherein the desired images are defined by the shape of the electrodes.

FIG. 5 illustrates another preferred embodiment of the advantageous multiplanar electro-optic imaging system of the present invention in a partially schematic, exploded isometric view. The individual imaging cells which comprise the system illustrated in FIG. 5 are similar to the cell described in FIG. 3, and the embodiment of FIG. 5 may be thought as of a series of electro-optic imaging cells like the one illustrated in FIG. 3 stacked one behind the other so that the images produced by each may be seen in a single imaging area.

In FIG. 5 the transparent support plates 11 again sandwich spacer gasket 13 thereby providing a void or shallow, cuplike volume in which the electro-optic imaging material is enclosed. The individual imaging cells of the embodiment of FIG. 5 have a desired image configuration typically defined by the shape of at least one of the pair of electrodes which comprise each individual imaging cell. The electrodes in the desired image configuration 29 typically comprise a substantially transparent coating of conductive material upon the surface of the transparent support plate 11, and the corresponding electrode may comprise either substantially transparent conductive coating 12 upon the entire face of the opposite transparent support plate 11, or if desired, the electrodes on both sides of the electro-optic imaging material may comprise a matched pair in imagewise configuration.

Also, as described in conjunction with FIG. 3, both image and background areas on the same surface may be substantially transparent electrodes and may be operated together as a full area electrode. Again, here such electrodes may be on either or both sides of the imaging material. The electrodes in the desired image configuration 29 in FIG. 5 are electrically connected to external circuit 15, having source of potential 16 and selective switching means 27 therein, by thin or substantially transparent electrically conducting leads 30. The switching means 27 illustrated in FIG. 5 is adapted to operate a single imaging cell by a single incremented movement of the switch for each cell in the system, as might be done simultaneously by a rotary shaft, multiple contact switching system. It will be appreciated that any suitable switching system may be used to selectively operate the individual cells of the present invention.

When electro-optic material which is normally substantially transparent in the absence of an electrical field is used in the system described in FIG. 5, the desired image cell of the imaging system of FIG. 5 may be selectively imaged by selectively activating the cell through the use of external circuit means 15. The electro-optic material then responds by becoming light-scattering and translucent or even opaque in the desired image area having an electrical field across the electro-optic material. When the imaging system is viewed with transmitted light from source 26, observer 25 sees the translucent, light-scattering or opaque image through the substantially transparent cells which may be between the viewer 25 and the desired imaging cell, depending upon which cell in the multiplanar stack is activated. Nematic liquid crystalline materials are an example of electro-optic materials which are typically transparent in the absence of electrical fields and which may be imaged in the mode described here.

In embodiments of the imaging system described in FIG. 5 wherein the electro-optic material used is normally in a light-scattering, translucent or even opaque state in the absence of an electrical field, it is desirable to also have a system wherein background areas 31 in the individual imaging cells are also substantially transparent conductive electrodes in background configuration on the surface of transparent support plates 11. In this embodiment the boundary between the electrodes in imagewise configuration 29 and the background areas 31 may be a space having no electrically conductive coating thereon, or the boundary may be any suitable electrically insulating material. These background area electrodes may then be selectively operated by external circuit means 15 including selective switching system 27 whereby the background areas of any of the individual imaging cells in the multiplanar system are connected to circuit 15 by electrical leads 32 and may be activated along with the image areas of the same cells to make the entire area, in which the image usually appears, transparent so that light may be transmitted through the cells which are in front of the cell in which the desired image is being produced. For example, if the number "3" in the embodiment illustrated in FIG. 5 is the desired image, both the background and image areas of the cells having the numbers "1" and "2" as their respective image areas, are activated by the selective switching means 27 so that the electro-optic material in said cells becomes substantially transparent throughout the entire cell area. In this way, light transmitted from source 26 passes through the activated image area of the numeral "3," and is transmitted through the two cells in front of the desired imaging cell to the eye of the observer 25. Conversely, the background area of the "3" cell may be activated along with the entire areas of the "1" and "2" cells, and light transmitted from source 26 passes through the background area giving the viewer 25 a translucent or opaque image on a transparent background. Of course, in both of the imaging modes just described, any imaging cells between the light source 26 and the desired image cell would also be correctly circuited so that such cells are in the most completely transparent state. Cholesteric liquid crystalline materials are an example of electro-optic materials which are typically light-scattering and translucent in the absence of electrical fields and which may be imaged in the mode just described.

In FIG. 6 yet another preferred embodiment of the advantageous multiplanar electro-optic imaging system of the present invention is shown in a partially schematic, exploded isometric view. This embodiment comprises a single electro-optic imaging cell having a stacked, multiplanar series of electrodes in different imagewise configurations substantially on one side of the electro-optic imaging material. As illustrated in FIG. 6, the imaging cell comprises transparent support plate 11 having substantially transparent electrically conductive coating 12 thereon which acts as one electrode in the imaging cell. The electro-optic imaging material is contained within the void or shallow cuplike area enclosed by spacing gasket 13 sandwiched between transparent support plates 11. The desired image is defined by substantially transparent conductive coatings in imagewise configuration 29 and/or in background configuration 30 on any suitable transparent support member 11, and a multiplanar series of such shaped electrodes is stacked in front of or behind the electro-optic imaging material. Where the system having the multiplanar series of shaped electrodes also has full-area, substantially transparent electrodes 12 on both sides of the imaging material, then shaped image electrodes may be placed on both sides of the imaging cell and used in conjunction with the full-area electrode on the opposite side of the cell to produce the desired image.

Also, where both image and background areas on the same surface are substantially transparent electrodes and they may be operated as a full-area electrode, separate full-area electrodes are unnecessary in the embodiment where stacks of imagewise electrodes are placed on both sides of the imaging material. Such an arrangement helps minimize the distance between any image electrode and its corresponding full-area electrode on the opposite side of the imaging material, which tends to enhance the quality of the image.

In operation, this system is activated by external circuit 15 having source of potential 16 herein and the desired image or background is selectively activated by switching means here illustrated at 27. The electrical field in imagewise configuration produced by the electrode in imagewise configuration along with the opposite electrode, here substantially transparent electrically conductive coating 12, causes the electro-optic material in the imagewise area to go through its electro-optic transition thereby creating an imagewise pattern which can be viewed by observer 25 with transmitted light from source 26 passing through the imaging system, including all of the substantially transparent imagewise configuration electrodes which may be stacked in front of the electro-optic imaging material. It will be appreciated that the individual electrodes in imagewise configuration which are stacked one behind the other are typically separated by an appropriate electrically insulating material, here the transparent support plates 11. The electrical field which creates the image across the electro-optic material is typically most sharply defined at its edges when the two electrodes between which said field is created are as close together as possible while still maintaining a potential difference between said electrodes. Therefore, it is most, advantageous to have transparent support members 11 or other electrode-separating, insulating material which is as thin as possible, thereby minimizing the distance between the desired image electrode and its companion electrode on the opposite side of the electro-optic imaging material. It may be desirable to use an electrical circuit 15 wherein the potential difference across the electro-optic imaging material produces approximately equal field strengths regardless of which image electrode is used to produce the desired image, thereby producing an approximately equal electro-optic effect in the imaging material. Means for regulating the potential in circuits in such a manner are well known in the electrical arts.

As described earlier in conjunction with the single imaging cells, the preferred embodiments of the multiplanar imaging systems may be advantageously used in conjunction with image contrast enhancing devices such as polarizers or crossed polarizers. Also, many of the preferred embodiments may be satisfactorily used with reflected as well as transmitted light illuminating the desired image.

Although FIGS. 4, 5, and 6 illustrate preferred embodiments of the present invention which show only three desired images, it is clear that any number of such image cells may be used in a single such imaging system. Likewise, any desired image, letter, number, figure or any other character or the like may be used in the individual cells of the inventive system.

The following examples further specifically define the present invention wherein a multiplanar series of alphanumeric images in conjunction with an electro-optic imaging cell are arranged in a multiplanar imaging system suitable for displaying the image produced by one or more of the selected images. The parts and percentages are by weight unless otherwise indicated. The examples below are intended to illustrate various preferred embodiments of the novel multiplanar, alphanumeric, electro-optic imaging system.

EXAMPLE I

A two-cell imaging system is constructed using NESA coated glass Bioloid microscope slides available from Will Scientific Corporation, Rochester, N.Y., of dimensions of about 3 inches by 1 inch by 0.05 inches. Each individual cell comprises two of the substantially transparent, conductive NESA slides, having a spacer of polypropylene, of thickness of about 1 mil between the conductive coating. In one of the spacers the letter "T" is cut out and in the other spacer the letter "K" is cut out, so that the spacers in combination with the NESA glass slides define cuplike areas in the desired image configurations. The electro-optic imaging material here comprising a mixture of about 60 percent cholesteryl chloride and about 40 percent cholesteryl nonanoate is placed in the cuplike image-defining areas of the individual cells, and the second NESA glass slide is also placed with its conductive coating in contact with the electro-optic material. The "T" and "K" cells are stacked one on top of the other and placed in front of a source of white light. Electrical leads are connected to each of the four substantially transparent electrodes, and to an electrical circuit including selective switching means and a source of potential difference capable of producing a potential difference of over 300 volts. A potential difference of about 250 volts DC is placed across the substantially transparent electrodes of the "T" cell, and the electro-optic liquid crystal mixture in the "T" cell becomes substantially transparent thereby making the milky, translucent "K" image visible when the "T" cell stacked on top of the "K" cell is placed in front of a 60-watt frosted bulb light source. The system is then switched to place the field across the "K" cell, thereby making it transparent, and allowing the milky translucent "T" cell to be viewed in transmitted light. This system produces clear, sharp images in the desired image cell. The very thin construction of the imaging member minimizes the amount of the electro-optic material necessary in such imaging members.

EXAMPLE II

A three-cell imaging system is constructed using chromium coated Bioloid microscope slides of dimensions of about 3 inches × 1 inch × 0.05 inch. Each individual cell comprises two of the substantially transparent, conductive chromium coated slides, having a spacer of Mylar polyester resin film available from duPont, of thickness of about 1½ mils between the conductive coatings. In one of the spacers the letter "T" is cut out, in another the letter "K" is cut out, and in the third the letter "E" is cut out, so that the spacers in combination with the chromium coated slides define cuplike areas in the desired image configurations. The electro-optic imaging material is a mixture of about 96 percent cholesteric liquid crystals here comprising about 60 percent cholesteryl chloride and about 40 percent cholesteryl nonanoate; and about 4 percent duPont oil red dye. The electro-optic material is placed in the cuplike, image-defining areas of the individual cells, and the second chromium coated glass slide is also placed with its conductive coating in contact with the electro-optic material. The "T," "K," and "E" cells are stacked one on top of the other and placed in front of a source of white light, here a 60-watt frosted bulb. Electrical leads are connected to each of the six substantially transparent electrodes, and to an electrical circuit including selective switching means and a source of potential difference capable of producing a potential difference of over 300 volts. A potential difference of about 250 volts DC is placed across the substantially transparent electrodes of the "T" cell, and of the "K" cell, and the electro-optic liquid crystal mixture in these cells becomes substantially transparent thereby making the milky, translucent "E" image visible when the "T" and "K" cells are stacked on top of the "E" cell and placed in front of the light source. Similarly, the system is switched to place the field across the "T" and "E" or the "K" and "E" cells thereby making the milky, translucent cell which is not affected by an electric field in each configuration, the visible cell to the observer when the cell is viewed in transmitted light.

This system also produces clear, sharp images in the desired image cell. Any individual cell or combinations of cells may be viewed in the same manner.

EXAMPLE III

The three-cell imaging system of example II is used with a nematic liquid crystalline material, anisylidene paraaminophenylacetate, as the electro-optic material. The nematic material is maintained in its mesomorphic state at a temperature of about 97° C. Only the desired image cell has the potential difference of about 250 volts DC applied across the electrodes. The nematic material in the electric field becomes translucent and light scattering so that the desired image shows up when the imaging system is observed in transmitted or reflected light. The unactivated cells remain substantially transparent.

EXAMPLE IV

A three-cell imaging system is constructed using chromium coated Bioloid microscope slides of dimensions of about 3 inches by 1 inch by 0.05 inch. Each individual cell comprises two of the substantially transparent, conductive chromium coated slides, one of which has the substantially transparent conductive chromium coating etched to leave only the desired image configuration as the electrode. Such etched electrodes are created in desired image configurations in the shape of the letters "T" "K" and "E." Each of the desired image configurations is used in conjunction with another full-area substantially transparent conductively coated slide in an imaging sandwich wherein the electrodes are separated by a Teflon spacer of thickness of about 1 mil. The Teflon spacers have substantially all of their area cut out thereby making the spacer a gasket framing the entire desired image area of the individual cell. The Teflon spacer gaskets along with one of the substantially transparent electrodes in each cell defines a cuplike area which contains the electro-optic imaging material. Here the electro-optic imaging material is a nematic liquid crystal, VL-1047-N, available from the Van Light Corporation, Cincinnati, Ohio.

The second substantially transparent electrode in each cell is placed with its conductive coating in contact with the electro-optic material. The "T," "K," and "E" cells are stacked one on top of the other and placed in front of a source of white light, here a Unitron light with a 8V54 bulb operated at about 8 volts. Electrical leads are connected with each of the six substantially transparent electrodes, and to an electrical circuit including selective switching means and a source of potential difference capable of producing a potential difference of about 150 volts. A potential difference of about 80 volts DC is placed across the substantially transparent electrode of the desired imaging cell, here the "K" cell, and the electro-optic nematic liquid crystal mixture in this cell becomes translucent and light scattering in the image area thereby making the "K" image visible through the substantially transparent "T" cell, which is stacked in front of the "K" cell, when the "K" cell is viewed with light transmitted from the light source through the substantially transparent "E" cell which is stacked in back of the "K" cell. Similarly, the system is switched to place the field across the "T" or the "E" cells thereby making a translucent, light-scattering image visible in the desired cell when the electric field is placed across the desired cell.

This system produces clear, sharp images in the desired image cell. Any individual cell or combinations of cells may be viewed in the same manner. This system is advantageous because of the low voltages necessary for operation, and because its switching times are quite short.

EXAMPLE V

A three-cell imaging system is constructed using chromium coated Bioloid microscope slides. Each cell comprises two such substantially transparent conductive chromium coated slides, one of which has the image outlined by an etched line which separates the conductive image area from the conductive background area. Both image and background areas are separate electrodes. The letters "T," "K," and "E" are etched in the image electrodes in this manner. Teflon gasket-spacers of thickness of about one-half mil are cut out as in example IV. The cells are filled with a cholesteric liquid crystalline electro-optic imaging material, a mixture of about 60 percent cholesteryl chloride and about 40 percent cholesteryl nonanoate. The second transparent electrode in each cell is placed with its conductive coating in contact with the electro-optic material. The cells are stacked one on top of the other, and the stack is placed in front of a source of white light as in example I. Electrical leads are connected with each of the nine substantially transparent electrodes and to an electrical circuit including selective switching means and a source of potential capable of producing a potential difference of over about 400 volts. A potential difference of about 300 volts DC is placed across every electrode pair except the desired image areas. All areas of the cholesteric electro-optic material in electrical fields become transparent, and the desired image area remains milky, translucent and light scattering to transmitted light from the source.

Similarly, a desired image area may be displayed by providing the electrical field across all undesired image areas in the stacked imaging sandwich of this example. Also, the image may be a transparent area in a light-scattering background, depending upon the desire of the operator.

EXAMPLES VI AND VII

A single-cell, three image system is produced by providing the three image electrodes of example V on one side of a single electro-optic imaging cell as described in example V. Using the cholesteric electro-optic material of example V, the desired image is provided by providing the electrical field across the background area of the desired image character electrode, thereby producing a light-scattering translucent image when viewed with transmitted light.

Using the nematic electro-optic material of example III in this imaging cell, only the desired image area is provided with the electrical field by providing the potential difference across the desired image electrode and the full-area electrode. Again, this system produces a light-scattering translucent image in transmitted light.

EXAMPLE VIII

Using the three-cell imaging system of example V, a mixture of Graphite particles suspended in Dow Corning 704 silicone oil is used as the electro-optic imaging material in cells of thickness of about 7 mils. A voltage of about 200 volts AC at about 10,000 cycles per second is placed across the desired image area.

The desired image is transparent in the areas of applied field when viewed in transmitted light from a 60-watt frosted bulb source.

EXAMPLE IX

Using the three-cell imaging system of example V, a racemic mixture of cholesteric liquid crystalline material comprising about 65 percent cholesteryl chloride and about 35 percent cholesteryl nonanoate at about 25° C., is used as the electro-optic imaging material. Imaging is performed by the method of example V with similar results.

Although specific components and proportions have been stated in the above description of the preferred embodiments of the multiplanar alpha-numeric, electro-optic imaging system of the present invention, other suitable materials and variations in the various steps in this system as listed herein, may be used with satisfactory results and various degrees of quality. In addition, other materials and steps may be added to those used herein and variations may be made in the process to synergize, enhance, or otherwise modify the properties of the invention. For example, various other electro-optic materials which will undergo appropriate electro-optic transitions may be discovered and used in this system of the present invention, and such materials may require somewhat different imaging conditions for preferred results. Likewise, various other electrical circuits may be used for selectively actuating the various desired image areas and nonimage areas in order to provide the desired image on the visible area of the imaging system.

It will be understood that various other changes in the detailed, materials, steps and arrangements of elements which have been herein described and illustrated in order to explain the nature of the invention, will occur to and may be made by those skilled in the art, upon a reading of this disclosure, and such changes are intended to be included within the principle and scope of this invention.

What is claimed is:

1. A multiplanar electro-optic display device comprising: a layer of electro-optic material, a multiplanar plurality of substantially transparent electrodes in specific desired image configurations on one side of said layer of electro-optic material, said multiplanar plurality of electrodes stacked adjacent one another seriatim on said one side of the layer of electro-optic material, without other layers of electro-optic material between electrodes in said stacked plurality of electrodes, and a full-area substantially transparent electrode on the opposite side of said layer of electro-optic material.

2. The display device of claim 1 additionally comprising means for electrically activating at least one of said electrodes in image configuration to produce a desired optical image in the electro-optic layer.

3. The display device of claim 1 additionally comprising means for electrically activating at least one of said electrodes in image configuration and the full-area electrode on the opposite side of said layer of electro-optic material to produce an imagewise electrical field across said layer of electro-optic material and thereby produce a desired optical image in said layer.

4. The display device of claim 3 wherein said means for electrically activating the device comprises means to activate the full-area electrode and means to selectively activate any one of or combination of the electrodes in image configuration.

5. The display device of claim 3 wherein said means for electrically activating the device comprises means for providing electrical fields of substantially constant field strengths between the full-area electrode and any one of the electrodes in image configuration.

6. The display device of claim 2 wherein said device additionally comprises image enhancing means comprising a pair of polarizers on opposite sides of said multiplanar device.

7. The display device of claim 6 wherein said polarizers are plane polarizers and the respective planes of polarization of said polarizers are substantially crossed.

8. The display device of claim 2 wherein the electro-optic material comprises a liquid crystalline material.

9. The display device of claim 8 wherein said liquid crystalline material comprises a material selected from the group consisting of: cholesteric liquid crystalline materials, smectic liquid crystalline materials, nematic liquid crystalline materials, and mixtures thereof.

10. The device of claim 8 wherein said liquid crystalline material is a racemic mixture comprising cholesteric liquid crystalline materials.

11. The display device of claim 2 wherein said layer of electro-optic material is of a thickness not greater than about 7 mils.

12. The display device of claim 2 additionally comprising a substantially transparent electrode in complementary background configuration coplanar with an electrode among the multiplanar plurality of electrodes defining the desired image configurations, with said complementary coplanar background and image electrodes electrically insulated from one another.

13. The display device of claim 12 wherein each electrode among the multiplanar plurality of electrodes defining desired image configurations is accompanied by a substantially transparent electrode in complementary background configuration coplanar with said electrode defining the desired image configuration, with said complementary coplanar background and image electrodes electrically insulated from one another.

14. The display device of claim 13 wherein the means for electrically activating the device comprises means to activate the full-area electrode and means to selectively activate any one or combination of the electrodes in image and background configurations.

15. The display device of claim 14 wherein said means for electrically activating the device comprises means for providing an electrical field of substantially constant field strength between the full-area electrode and any one of the electrodes in image or background configuration.

16. The display device of claim 2 wherein the full area electrode on the opposite side of the layer of electro-optic material comprises: a substantially transparent electrode defining a desired image configuration and a substantially transparent electrode in complementary background configuration coplanar with the electrode defining a desired image configuration, with said complementary image and background electrodes electrically insulated from one another.

17. The display device of claim 13 wherein the full area electrode on the opposite side of the layer of electro-optic material comprises: a substantially transparent electrode defining a desired image configuration and a substantially transparent electrode in complementary background configuration coplanar with the electrode defining a desired image configuration, with said complementary image and background electrodes electrically insulated from one another.

18. The display device of claim 16 additionally comprising means for electrically activating at least one of said electrodes in image configuration among the multiplanar plurality of electrodes, and means for electrically activating both complementary coplanar background and image electrodes which comprise the full-area electrode on the opposite side of the layer of electro-optic material to produce an imagewise electrical field across said layer of electro-optic material thereby producing a desired optical image in said layer.

19. The display device of claim 17 wherein said means for electrically activating the device comprises means to selectively activate any one or combination of the electrodes in image configuration among the multiplanar plurality of electrodes on said one side of the layer of electro-optic material, and means to selectively activate either portion of the complementary coplanar background and image electrodes which comprise the full area electrode on the opposite side of said layer of electro-optic material.

20. The display device of claim 19 wherein said means for electrically activating the device comprises means for providing electrical fields of substantially constant field strengths between any electrode on said one side of the layer of electro-optic material and any electrode on the opposite side of said layer of electro-optic material.

21. The display device of claim 17 additionally comprising on the opposite side of the layer of electro-optic material a multiplanar plurality of substantially transparent electrodes in specific desired image configurations and substantially transparent electrodes in complementary background configurations coplanar with each electrode defining a desired image configuration, with said complementary image and background electrodes electrically insulated from one another, and said multiplanar plurality of electrodes are stacked adjacent one another on said opposite side of the layer of electro-optic material, without other layers of electro-optic material between electrodes in said stacked plurality of electrodes.

22. The display device of claim 21 wherein the means for electrically activating the device comprise means for providing an electrical field between any electrode or combination of electrodes on said one side of the layer of electro-optic material and any electrode or combination of electrodes on the opposite side of said layer of electro-optic material.

23. The display device of claim 22 wherein said means for electrically activating the device comprises means for providing electrical fields of substantially constant field strengths between any electrode or combination of electrodes on said one side of the layer of electro-optic material and any electrode or combination of electrodes on the opposite side of said layer of electro-optic material.

24. The display device of claim 1 wherein said full-area electrode is also in a desired image configuration and the area of said full area electrode is at least coextensive with the area of any one of or combination of the electrodes in image configuration among the multiplanar plurality of electrodes.

25. The display device of claim 24 additionally comprising means for electrically activating at least one of said electrodes in image configuration and the full-area electrode on the opposite side of said layer of electro-optic material to produce an imagewise electrical field across said layer of electro-optic material and thereby produce a desired optical image in said layer.

26. An imaging method comprising:
providing a multiplanar electro-optic display device comprising a layer of electro-optic material, a multiplanar plurality of substantially transparent electrodes in specific desired image configurations on one side of said layer of electro-optic material, said multiplanar plurality of electrodes stacked adjacent one another seriatim on said one side of the layer of electro-optic material, without other layers of electro-optic material between electrodes in said stacked plurality of electrodes, and a full-area substantially transparent electrode on the opposite side of said layer of electro-optic material; and providing in operative electrical connection with said device means for electrically activating the device wherein said means comprises means to activate the full-area electrode and means to selectively activate any one of or combination of the electrodes in image configuration; and electrically activating the full-area electrode and at least one of the electrodes in image configuration to produce an imagewise electrical field across the layer of electro-optic material and thereby produce a desired optical image in said layer.

27. The method of claim 26 wherein said device additionally comprises image enhancing means comprising a pair of polarizers on opposite sides of said multiplanar device.

28. The method of claim 27 wherein said polarizers are plane polarizers and the respective planes of polarization of said polarizers are substantially crossed.

29. The method of claim 26 wherein the electro-optic material comprises a liquid crystalline material.

30. The method of claim 29 wherein said liquid crystalline material comprises a material selected from the group consisting of: cholesteric liquid crystalline materials, smectic liquid crystalline materials, nematic liquid crystalline materials, and mixtures thereof.

31. The method of claim 30 wherein the electro-optic material comprises cholesteric liquid crystalline material, and the field strength of the imagewise electrical field is sufficient to produce a cholesteric-nematic phase transition in said electro-optic material in imagewise configuration.

32. The method of claim 26 wherein said layer of electro-optic material is of a thickness not greater than about 7 mils.

33. The method of claim 26 wherein said means for electrically activating the device comprises means for providing electrical fields of substantially constant field strengths between the full-area electrode and any one of the electrodes in image configuration.

34. The method of claim 26 wherein:

each electrode among the multiplanar plurality of electrodes defining desired image configurations is accompanied by a substantially transparent electrode in complementary background configuration coplanar with said electrode defining the desired image configuration, with said complementary coplanar background and image electrodes electrically insulated from one another;

and wherein the means for electrically activating the device comprises means to activate the full-area electrode and means to selectively activate any one or combination of the electrodes in image and background configurations.

35. The method of claim 34 wherein:

the full-area electrode on the opposite side of the layer of electro-optic material comprises: a substantially transparent electrode defining a desired image configuration and a substantially transparent electrode in complementary background configuration coplanar with the electrode defining a desired image configuration, with said complementary image and background electrodes electrically insulated from one another;

and wherein said means for electrically activating the device additionally comprises means to selectively activate either portion of the complementary coplanar background and image electrodes which comprise the full-area electrode on the opposite side of the layer of electro-optic material.

36. The method of claim 35 wherein:

the device additionally comprises on the opposite side of the layer of electro-optic material a multiplanar plurality of substantially transparent electrodes in specific desired image configurations and substantially transparent electrodes in complementary background configurations coplanar with each electrode defining a desired image configuration, with said complementary image and background electrodes electrically insulated from one another, and said multiplanar plurality of electrodes stacked adjacent one another seriatim on said opposite side of the layer of electro-optic material, without other layers of electro-optic material between electrodes in said stacked plurality of electrodes;

and wherein the means for electrically activating the device comprises means for providing an electrical field between any electrode or combination of electrodes on said one side of the layer of electro-optic material and any electrode or combination of electrodes on the opposite side of said layer of electro-optic material.

37. The method of claim 26 wherein said full-area electrode is also in a desired image configuration and the area of said full-area electrode is at least coextensive with the area of any one of or combination of the electrodes in image configuration among the multiplanar plurality of electrodes.

* * * * *